(12) United States Patent
Garidel

(10) Patent No.: US 6,530,778 B2
(45) Date of Patent: Mar. 11, 2003

(54) CONDENSATION OVEN FOR HEAT TREATING A WORKPIECE

(76) Inventor: Jean-Paul Garidel, Chemin du Canal, 26400 Allex (FR)

( * ) Notice: Subject to any disclaimer, the term of this patent is extended or adjusted under 35 U.S.C. 154(b) by 0 days.

(21) Appl. No.: 09/881,814

(22) Filed: Jun. 18, 2001

(65) Prior Publication Data

US 2001/0030386 A1 Oct. 18, 2001

Related U.S. Application Data

(62) Division of application No. 09/235,298, filed on Jan. 22, 1999, now Pat. No. 6,248,282.

(30) Foreign Application Priority Data

Jan. 23, 1998 (FR) .............................................. 98 00942

(51) Int. Cl.[7] .............................................. F27D 7/06
(52) U.S. Cl. ...................... 432/66; 432/197; 432/199; 219/444.1
(58) Field of Search .......................... 432/66, 197, 199; 219/444.1; 118/724, 725, 715

(56) References Cited

U.S. PATENT DOCUMENTS

| | | | | |
|---|---|---|---|---|
| 4,194,297 A | * | 3/1980 | Pfahl, Jr. ............... | 165/104.12 |
| RE30,399 E | * | 9/1980 | Ammann et al. ........ | 228/180.1 |
| 4,238,186 A | * | 12/1980 | Pfahl, Jr. ................ | 165/104.27 |
| 4,348,174 A | * | 9/1982 | Spigarelli .............. | 165/104.11 |
| 6,045,864 A | * | 4/2000 | Lyons et al. ........... | 427/255.23 |
| 6,248,282 B1 | * | 6/2001 | Garidel ........................ | 264/347 |

FOREIGN PATENT DOCUMENTS

| | | |
|---|---|---|
| EP | 153 631 A | 9/1985 |
| EP | 247 815 A | 12/1987 |

* cited by examiner

Primary Examiner—Jiping Lu
(74) Attorney, Agent, or Firm—Bacon & Thomas, PLLC

(57) ABSTRACT

A condensation oven arranged to treat a workpiece including a casing having an internal structure defining a hermetic enclosure accessible via at least one door, a heater device operable to heat the internal structure to a predetermined temperature to enable a fraction of vapor obtained by vaporizing a heat transfer liquid to condense onto the workpiece, a vapor circulation system configured to circulate the vaporized liquid within the hermetic enclosure such that a fraction of the vapor condenses onto the workpiece, an extractor device operable to extract vapor within the hermetic enclosure of the oven, and a control unit configured to control the heater device and the extractor device when the at least one door is closed.

7 Claims, 1 Drawing Sheet

CONDENSATION OVEN FOR HEAT TREATING A WORKPIECE

This is a division of application Ser. No. 09/235,298, filed Jan. 22, 1999, now U.S. Pat. No. 6,248,282.

The present invention relates to the technical field of treatment in the general sense by means of a heat transfer liquid, the treatment being applied to workpieces of any kind, and the method preferably relates to treating workpieces formed on a support on which components of the electronic, electrical, electro-mechanical, or mechanical type, for example, are mounted by means of a filler material that is deposited locally in association with component fixing tabs.

BACKGROUND OF THE INVENTION

A particularly advantageous application of the invention lies in the treatment technique relating to assembling components by polymerization in which the filler material is constituted by a polymer, or in the component soldering or reflow technique in which the filler material is constituted by an alloy.

In the preferred technical field of the invention, various types of machine are known for fixing components on a support by melting a filler material. Thus, it is known to use a soldering machine for raising the temperature of the support and the components quickly and uniformly to a temperature which is slightly higher than the melting point of the filler material, thereby enabling bonding to be obtained by soldering or polymerizing the filler material.

In the state of the art, it is known to make a first category of machine in the form of a convection oven, an infrared oven, or a forced convection oven, optionally fitted with means for providing a controlled atmosphere. The main advantage of using an oven lies in the ease with which it can be inserted in a manufacturing line. Similarly, an oven makes it possible to treat workpieces on a continuous basis. Nevertheless, it must be understood that an oven presents major drawbacks associated essentially with relatively long treatment time, poor transmission of heat to the workpieces to be treated, high cost, and the use of an inert gas for ovens that operate under a controlled atmosphere.

A second category of machine is known in the state of the art that performs treatment by using the vapor of a heat transfer liquid. Thus, a vapor treatment machine generally comprises a vessel containing a liquid of the fluorocarbon type that is designed to be raised to a boiling temperature by heater means so as to produce a primary vapor that is saturated and inert in an assembly or bonding zone, with the temperature of the primary vapor being slightly higher than the melting point of the filler material The assembly or bonding zone extends substantially between the surface of the liquid and a heat exchanger coil for condensing the primary vapor. This assembly or bonding zone is optionally surmounted by a preheater zone or by a cooling zone occupied by a secondary vapor.

In its top portion, the vessel has a through opening that can be closed by a lid and that is designed to allow a support fitted with components that are to be assembled thereon to be inserted inside the vessel. Such a support is taken by a device which moves it and holds it successively in the preheating zone, in the bonding zone, and in the cooling zone. Thus, after the support has been held in the preheating zone for a determined length of time, it is brought into contact with the primary vapor to obtain a transfer of the latent heat of condensation of the vapor to the support and the associated components. This supply of heat raises the temperature of the support and the components quickly and uniformly to the temperature of the primary vapor, thereby causing the filler material to melt, and consequently, depending on the technique in use, causing the components to be bonded to the support by soldering or by polymerization.

That type of machine has undeniable advantages concerning the uniformity and the quality of heat transfer and it requires lower investment than that required for an oven. Nevertheless, that type of machine suffers from drawbacks concerning consumption of the heat transfer liquid and the difficultly of inserting the machine in a manufacturing line, and consequently of performing treatment on a continuous basis.

An investigation of previously known techniques leads to the observation that, at present, there exists no treatment machine which gives full satisfaction.

OBJECTS AND SUMMARY OF THE INVENTION

The object of the invention is to remedy that problem by proposing a method of applying heat treatment to a workpiece which is suitable for combining the advantages of the two known techniques while avoiding their drawbacks.

An object of the invention is thus to propose a method of applying heat treatment to a workpiece by means of a heat transfer liquid which enables the treatment operation to be integrated in a manufacturing line, thereby enabling treatment to be performed on a continuous basis, said method also providing heat transfer that is uniform and of good quality.

To achieve these objects, the invention thus provides a method of applying heat treatment to a workpiece by means of at least one heat transfer liquid having a boiling point at a given value, consisting in:
   in placing the workpiece to be treated inside an oven whose internal structure defines a hermetic enclosure that is accessible via at least one door;
   in placing the internal structure of the oven at a temperature that is suitable for enabling a fraction of a vapor obtained by vaporizing a heat transfer liquid to condense on the workpiece to be treated;
   in causing the enclosure of the oven to be occupied by said vapor so as to ensure that a fraction of it condenses on the workpiece to be treated;
   in extracting the vapor that remains in the oven enclosure; and
   in extracting the workpiece from the oven.

The invention also provides a condensation oven for treating a workpiece, the oven comprising:
   a case whose internal structure defines a hermetic enclosure that is accessible via at least one door;
   heater means for heating the internal structure to a temperature suitable for enabling a fraction of vapor obtained by vaporizing a heat transfer liquid to condense on the workpiece to be treated;
   a system for causing vapor obtained by vaporizing the liquid to occupy the inside of the enclosure, a fraction of which vapor is to condense on the workpiece to be treated; and
   an extractor device for extracting the vapor occupying the inside of the hermetic enclosure of the oven.

BRIEF DESCRIPTION OF THE DRAWING

Various other characteristics appear from the following description made with reference to the accompanying drawing which shows, as a non-limiting example, an embodiment and implementation of the invention.

MORE DETAILED DESCRIPTION

Figure 1:
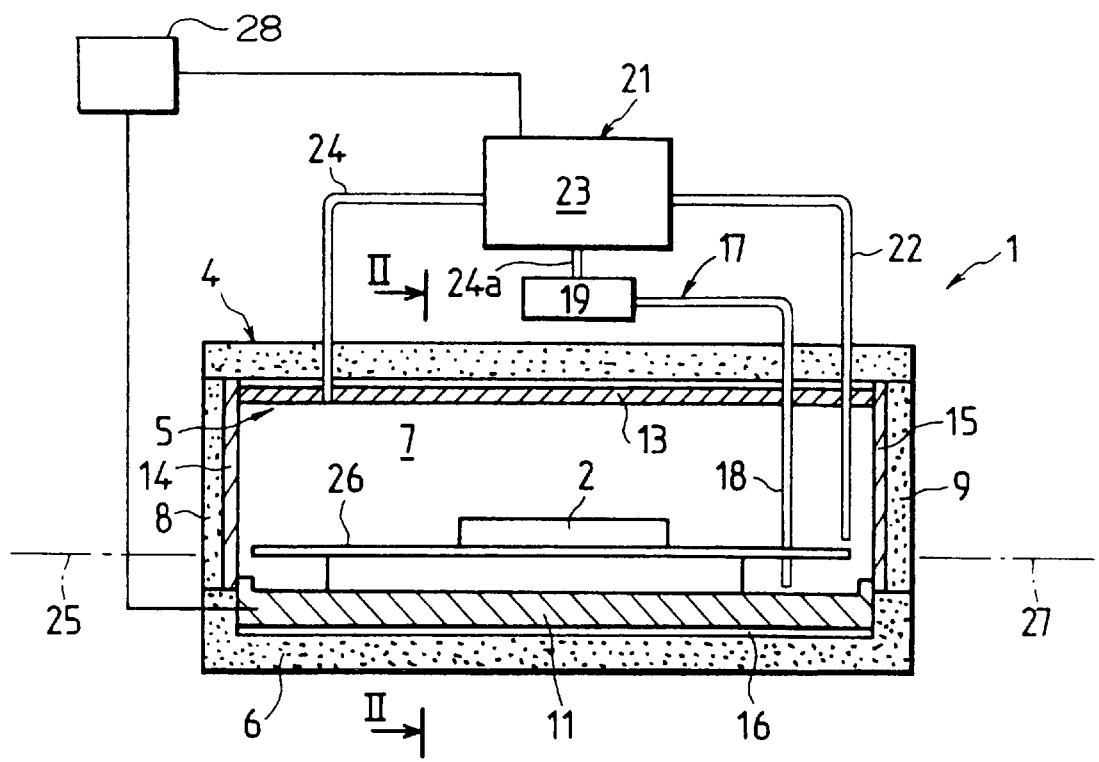
FIG. 1 is a longitudinal section in elevation of a diagrammatic embodiment of an oven of the invention.
Figure 2:
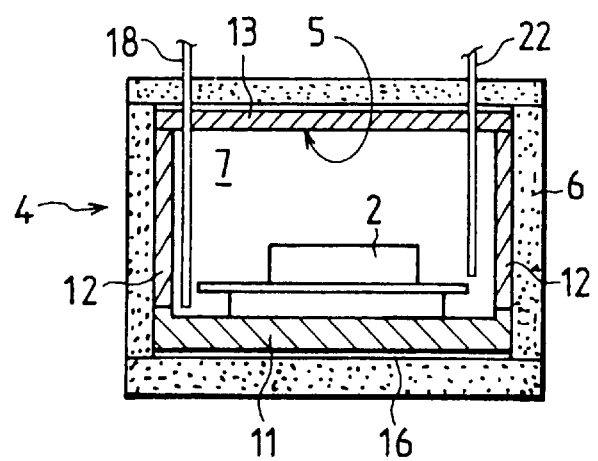
FIG. 2 is a cross-section taken substantially on line II—II of FIG. 1.

FIGS. 1 and 2 show an embodiment of an oven 1 of the invention for applying heat treatment in the general sense to a workpiece 2. In the preferred embodiment described below, the workpiece 2 is constituted by a support fitted with components of any type in combination or otherwise, such as electronic, electrical, mechanical, or electromechanical components, organized in appropriate manner to perform specific functions for an intended application. In the example shown, the oven 1 is designed to assemble components to the support by melting a filler material that is deposited locally in association with fixing tabs of the components. In conventional manner, the filler material is constituted by a polymer or by an alloy. For example, the support is constituted by a printed circuit which, when fitted with its various components, constitutes a card or workpiece 2.

The oven 1 of the invention comprises a case 4 made up of a "hot" internal structure 5 and preferably fitted with thermally insulating lagging 6. The inside of the internal structure 5 defines a hermetically closed enclosure 7 that is accessible via at least one door, and preferably as shown in the embodiment via two doors 8 and 9 constituting an inlet and an outlet.

In the embodiment shown, the internal structure 5 has a sole plate 11 from which there rise two vertical side walls 12 terminating in a ceiling 13. In the example shown, the internal structure 5 also has front and back walls 14 and 15 belonging respectively to the inlet door 8 and the outlet door 9 which are fitted with conventional automatic opening and closing means (not shown). The internal structure 5 constituted by the sole plate 11, the side walls 12, the ceiling 13, and the front and back walls 14 and 15 defines on its inside a sealed or hermetically closed enclosure when the doors are closed. The various elements constituting the internal structure 5 are made of a material that has good capacity for conducting or transferring heat. For example, the sole plate 11, the side walls 12, the sealing 13, and the front and back walls 14 and 15 are elements that are in the form of metal plates.

The oven 1 is fitted with heater device 16 for heating the internal structure 5 so as to place it at a determined temperature. For example, the heater device 16 is constituted by electrical resistances mounted on the outside faces of at least some of the component parts of the internal structure 5, and preferably on all of them. Naturally, the heater device 16 could be implemented in other ways, for example by using a circuit in which a heat-conveying fluid is circulated. The internal structure 5 is preferably provided on its outside with thermally insulating lagging 6 to limit heat losses. The thermally insulating lagging 6 can be constituted in any appropriate manner known to the person skilled in the art for covering the various parts constituting the internal structure 5.

According to the invention, the oven 1 is fitted with a vapor circulation system 17 suitable for causing the inside of the enclosure 7 to be occupied by a vapor obtained by evaporating a heat transfer liquid having a boiling point or temperature of given value. In the application under consideration for soldering components, the boiling temperature of the liquid is higher than the melting point of the filler material. According to a preferred characteristic of the invention, the system 17 for causing the inside of the enclosure to be occupied by the vapor is constituted by a feed circuit 18 for supplying heat transfer liquid contained in a tank 19. The liquid feed circuit 18 advantageously opens out onto the sole plate 11 of the oven whose inside face is adapted to enable it to receive the liquid which spreads thereover. The sole plate 11 of the oven is raised to a temperature higher than the boiling point of the liquid so as to cause it to evaporate. The sole plate 11 of the oven is also designed to retain a temperature higher than the boiling point of the liquid, even while liquid is being fed onto its inside face. To this end, the sole plate 11 is adapted to accumulate sufficient heat to ensure that the liquid put into contact with its inside face is evaporated.

It may be observed that the system 17 for causing the inside of the enclosure 7 to be occupied by a vapor could be provided in the form of a system that feeds vapor to the inside of the enclosure. The vapor would be obtained outside the enclosure by any appropriate means by vaporizing a heat transfer liquid. It should be understood that what matters in the invention is to have vapor inside the enclosure 7 so that at least some of it can condense on the workpiece 2 to be treated.

According to another characteristic of the invention, the oven 1 has an extractor device 21 for extracting the vapor occupying the inside of the hermetically closed enclosure 7. In a preferred variant, the extractor device 21 is constituted by a suction circuit 22 opening out into the bottom portion of the enclosure 7 and connected outside the oven to a condensation unit 23 for condensing the sucked-out vapor. The condensation unit 23 has a return pipe 24 opening out into the hermetic enclosure 7 so as to deliver thereto the air that has previously been sucked out and discharged with the vapor. The extractor device 21 thus constitutes a closed circuit for condensing the vapor contained in the hermetic enclosure 7. The condensation unit 23 is preferably fitted with a return circuit 24a for returning liquid to the tank 19.

Naturally, other forms of vapor extractor device 21 could be provided. For example, the device could be constituted by a condenser placed inside the enclosure 7 of the oven for condensing the vapor inside the hermetic enclosure. In such an embodiment, the enclosure would be fitted with means for extracting the heat transfer liquid to enable the enclosure to be emptied.

The oven 1 of the invention is preferably also fitted with a control unit 28 for governing the operation of the various elements constituting it in application of a treatment cycle as described below.

Implementation of the condensation oven of the invention follows directly from the above description.

The oven 1 is directly adapted to apply treatment to a workpiece 2 which is conveyed by any known conveyor means 25 to the inside of the oven 1 which is fitted with conventional internal conveyor means 26 adapted to carry the workpiece 2. The doors 8 and 9 are closed so as to obtain a hermetic enclosure 7. The heater device 16 sets the internal structure 5 of the oven at a temperature appropriate for enabling a fraction of the vapor obtained by evaporating the heat transfer liquid to condense on the workpiece to be treated. The internal structure 5 of the oven is preferably placed at a temperature which is higher than the boiling point of the liquid. By way of example, for a liquid having a boiling temperature of about 215° C., provision can thus be made to place the internal structure at a temperature of about 240° C. The heat transfer liquid is fed by the pipe 18 so as to come into contact with the sole plate 11, thereby ensuring that it evaporates almost instantaneously inside the hermetic enclosure. Vaporization thus takes place inside the enclosure and the vapor content thereof rises progressively until it reaches saturation inside the enclosure. According to a preferred embodiment characteristic, all of the internal structure 5 is raised to a temperature higher than the boiling point of the liquid so that the vapor does not condense on the internal structure. By definition, it must be understood that the internal structure 5 also includes all of the apparatuses or elements situated inside the oven in addition to those constituting the case 4 and defining the enclosure 7. It should thus be understood that the internal structure 5 includes, in particular, the liquid feed pipe 18, the suction circuit 22, and the conveyor device 26.

By condensing, the vapor occupying the enclosure 7 transmits its heat energy to the workpiece 2 to be treated. On changing state, the vapor delivers its latent heat of vaporization to the workpiece 2 which is at a temperature below the boiling temperature of the liquid. In the component soldering application under consideration by way of example, it should be considered that the saturated and inert vapor has a temperature that is slightly higher than the melting point of the filler material previously deposited in association with the fixing tabs of the components. This causes the components to be assembled to the support of the workpiece.

After the assembly operation, the extractor device 21 is operated to suck out the vapor remaining inside the hermetic enclosure 7. The extractor device 21 returns air from which vapor has been removed to the hermetic enclosure 7 via the pipe 24. When the hermetic enclosure 7 contains no more vapor, the door 9 is opened to allow the workpiece 2 to be extracted from the oven and taken by a conveyor 27. The oven 1 can then be used again for applying treatment to another workpiece 2.

The oven 1 of the invention makes it possible to treat workpieces in an inert atmosphere by means of a vapor whose temperature is higher than the boiling point of the heat transfer liquid. In fact the vapor is heated to above the boiling point of the liquid insofar as it occupies a closed enclosure 7 where the internal structure 5 of its case is raised to a temperature that is also higher than the boiling point of the liquid.

It should be observed that a relatively limited finite quantity of liquid is inserted into the enclosure in order to obtain a corresponding quantity of vapor. By way of example, it can be assumed that it is appropriate to insert 15 grams of liquid per liter of enclosure. The oven 1 of the invention thus has the advantage of operating with a limited quantity of liquid which is recycled on each treatment cycle. It should be understood that the liquid is transformed into vapor on a non-continuous basis, i.e. it is transformed sequentially, solely during the treatment time. In this respect, the control unit 26 which governs the treatment of each workpiece begins by causing the system 17 to produce vapor inside the enclosure and then continues by causing the device 21 to extract the vapor.

In the description of oven operation, it has been assumed that the quantity of vapor inside the enclosure needs to be sufficient to ensure that the workpiece is completely immersed in vapor. The quantity of vapor present inside the enclosure can be adjusted by adjusting the quantity of liquid injected onto the sole plate 11. Furthermore, in order to adjust the temperature of the system, it is possible to select a liquid from a plurality of heat transfer liquids each having a different boiling point. In this respect, the pipe 18 can be connected via valves to a plurality of tanks each filled with a different transfer liquid. Another advantage of the invention lies in the possibility of integrating the condensation oven in a manufacturing line enabling workpieces to be treated on a continuous basis. In this context, it should also be observed that during treatment, the workpiece to be treated remains in a single plane which is contiguous with the conveyor planes upstream and downstream of the oven.

The oven of the invention is suitable for treating one or more workpieces 2 simultaneously. In addition, the oven can advantageously be fitted with a porthole for observing how treatment is progressing.

In this respect, it should be observed that such a porthole implemented in the form of a plate of glass mounted in the ceiling 13 of the oven to seal off the assembly chemically, can advantageously be used to pass infrared radiation. The oven of the invention can be provided with a source of short or medium wavelength infrared radiation enabling thermal characteristics inside the oven to be modified. Such an oven fitted with an additional radiation type mode of operation can make the oven of the invention easier to use, since according to a characteristic of the invention each of the heating modes (convective, radiant, and by condensation) can be used on its own or in combination.

The invention is not limited to the examples described and shown, and various modifications can be applied thereto without going beyond its ambit.

I claim:

1. A condensation oven arranged to treat a workpiece, the oven comprising:

a casing having an internal structure defining a hermetic enclosure accessible via at least one door, the oven performing the heat treatment operation when the at least one door is closed thereby forming the hermetic enclosure;

a heater device operable to heat the internal structure to a predetermined temperature to enable a fraction of vapor obtained by vaporizing a heat transfer liquid to condense onto the workpiece;

a vapor circulation system configured to circulate the vaporized liquid within the hermetic enclosure such that a fraction of the vapor condenses onto the workpiece;

an extraction device operable to extract vapor within the internal structure of the oven; and a control unit configured to control said heater device and said extraction device when said at least one door is closed during the heat treatment operation, said control unit configured to set the heater device at a predetermined temperature within the internal structure such that a fraction of the vapor obtained by evaporating the heat transfer liquid condenses onto the workpiece to be treated, and initiate the extraction device to remove vapor remaining within hermetic enclosure before said door is opened.

2. The condensation oven according to claim 1, wherein the vapor circulation system includes a liquid feed circuit feeding onto a sole plate disposed along a base portion of the oven, said sole plate vaporizing the liquid.

3. The condensation oven according to claim 2, wherein the extraction device includes a vapor suction circuit fitted within a condensation unit having an outlet in communication with the enclosure.

4. The condensation oven according to claim 3, wherein the condensation unit includes a tank arranged to recover the heat transfer liquid, said tank connected to the liquid feed circuit.

5. The condensation oven according to claim 1, wherein said extraction device includes a condenser disposed within the enclosure of the oven.

6. The condensation oven according to claim 1, wherein the vapor circulation system includes a series of tanks filled with heat transfer liquids having boiling points of different values.

7. The condensation oven according to claim 1, wherein the case includes a porthole for passing short or medium wavelength infrared radiation produced by a corresponding infrared source.

* * * * *